(12) United States Patent
Attias et al.

(10) Patent No.: US 8,377,306 B2
(45) Date of Patent: Feb. 19, 2013

(54) METHOD FOR TREATING A FLUID USING A SELF-ORGANIZED NETWORK ADSORBED ON A SURFACE

(75) Inventors: Andre-Jean Attias, Paris (FR); Fabrice Charra, Marcoussis (FR); Ludovic Douillard, Antony (FR); Celine Fiorini, Orsay (FR); David Kreher, Clichy (FR); Fabrice Mathevet, Bourg Les Valence (FR); Guillaume Schull, Thannenkirch (FR)

(73) Assignee: Commissariat a l'Energie Atomique, Paris (FR)

( * ) Notice: Subject to any disclaimer, the term of this patent is extended or adjusted under 35 U.S.C. 154(b) by 819 days.

(21) Appl. No.: 12/295,288

(22) PCT Filed: Mar. 29, 2007

(86) PCT No.: PCT/FR2007/000545
§ 371 (c)(1),
(2), (4) Date: Sep. 23, 2009

(87) PCT Pub. No.: WO2007/118976
PCT Pub. Date: Oct. 25, 2007

(65) Prior Publication Data
US 2010/0012587 A1 Jan. 21, 2010

(30) Foreign Application Priority Data

Mar. 30, 2006 (FR) .................................. 06 02760

(51) Int. Cl.
*B01D 15/04* (2006.01)
*B01D 24/00* (2006.01)
(52) U.S. Cl. ........ 210/638; 210/656; 210/645; 210/767; 210/500.27; 210/506

(58) Field of Classification Search ........................ None
See application file for complete search history.

(56) References Cited

U.S. PATENT DOCUMENTS
2005/0214471 A1 9/2005 Theobald et al.

OTHER PUBLICATIONS

Griessl et al. "Incorporation and Manipulation of Cronene in an Organic Template Structure" Langmuir (2004), 20, 9403-9407.*
Zeng et al., "The two-dimensional self-assembled n-alkoxy-substituted stilbenoid compounds and triphenylenes studied by scanning tunneling microscopy", Surface Science, 538, 2003, L451-459.*
S.J.H. Griessl, "Incorporation and manipulation of coronene in an organic template structure", Langmuir, vol. 20, 2004, pp. 9403-9407.
Jun Lu, "Template induced Inclusion structures with Copper (II) Phthalocyanine and coronene as guests in two-dimensional hydrogen-bonded host networks". Journal of Physical Chemistry B, vol. 108, 2004, pp. 5161-5165.

(Continued)

*Primary Examiner* — Krishnan S Menon
*Assistant Examiner* — Allison M Gionta
(74) *Attorney, Agent, or Firm* — Young & Thompson (57) ABSTRACT

The invention concerns a method for treating a fluid. According to the invention, the fluid is contacted with a substrate at the surface of which there is a network of organic molecules, hereafter referred to as "network molecules". There is a central core and at least one lateral arm, the molecules being adsorbed at the surface of the substrate. The invention also concerns a two-dimensional molecular sieve formed by the substrate at the surface of which a network of network molecules is adsorbed. The invention further concerns a module for treating a fluid including a circulating device for the fluid to be treated, the device containing one or more two-dimensional molecule sieves.

22 Claims, 5 Drawing Sheets

OTHER PUBLICATIONS

S. Stepanow, "Programming Supramolecular Assembly and Chirality in Two-Dimensional dicarboxylate Networks on a Cu(100) Surface", Nano Letters, vol. 5, No. 5. 2005, pp. 901-904.

S. Stpeanow, "Steering molecular organization and host-guest interactions using two-dimensional nanoporous coordination systems", Nature Materials, vol. 3, Apr. 2004, pp. 229-233.

* cited by examiner

METHOD FOR TREATING A FLUID USING A SELF-ORGANIZED NETWORK ADSORBED ON A SURFACE

CROSS-REFERENCE TO RELATED U.S. APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

The present invention relates to a method for treating a fluid.

2. Description of Related Art Including Information Disclosed Under 37 C.F.R. 197 and 37 C.F.R. 1.98

The treatment of fluids, regardless whether for purification or enrichment for instance, may be realized by different techniques according to the scale at which it is desirable to work.

Separation membranes are used generally for applications on significant volumes of fluid, but this system is not satisfactory since the selectivity and/or the speed of transport remains limited. Besides, an application to samples of microscopic volume remains risky.

One of the ideal methods for separating biological molecules is gel electrophoresis (based upon differential transport of polyelectrolytes such as DNA or proteins). Gels having small-sized pores may be realized reproducingly. The latter, in addition to restricted lifetime, exhibit the shortcoming of possessing pores whereof spatial distribution remains aleatory. Finally, this technique remains slow and hardly automatable since efficient gels cannot be prepared beforehand.

The use of three-dimensional networks has been extended through the study of polymers. However, although numerous type of zeolite or nanoporous polymers have been developed, the developed surface of such systems still remains limited, and accessibility to the pores is restricted. The chemical composition of such systems is, moreover, relatively reduced ("adaptability" of the pores) and the reactivity of certain metallic salts may be an additional risk factor during purification.

One of the possible alternatives to these methods rests with the realization of "artificially" nanostructured networks having regular geometry, flexible and controllable so as to adapt the structures to various targets molecules. The available nanostructuring techniques ("top-down" approach) are however cumbersome to implement (since X-ray, electron or ion lithography usually requires white room working) [J. Fu, Applied Physics Letters, 2005, 87, 263902]. The production times are long and the costs are high.

Besides, and in spite of the recent development of techniques such as "nanoimprinting" (transfer of structures by means of pads), large-scale production of such regular structures remains problematic.

Until now, nanostructuring techniques have only enabled to obtain structures greater than a few ten nanometers. However, the needs to handle wide varieties of molecules of various size and shape require implementing fully new approach also compatible with large scale production imperatives. Consequently, so-called "bottom-up" technologies, using in particular self-assembly of molecules exhibits an interesting alternative.

However no method has truly enabled to provide confluence of the "top-down" and "bottom-up" techniques, nanoscopic structures of molecular size (1-10 nm) are hence required enabling to control selectively and rapidly the movement of individual molecules (selective transport) [D. Mijatovic, Lab on a Chip, 2005, 5, 492-500].

The aim of the present invention is to provide a method for treating a fluid, which remedies the shortcomings aforementioned, in particular as regards the passing speed of the fluid.

Another aim of the present invention is to provide a method for treating a fluid, which exhibits better fluid selectivity.

Other aims and advantages of the invention will appear in the following description, which is given solely for illustrative purposes and without being limited thereto.

BRIEF SUMMARY OF THE INVENTION

The present invention relates to a method for treating a fluid.

According to the invention, the fluid is contacted with a substrate at the surface of which there is a network of organic molecules, so-called molecules of network, or network molecules, having a central core as well as least one lateral arm, said network molecules being adsorbed at the surface of the substrate.

The present invention also relates to a two-dimensional molecular sieve (2-D sieve) formed of a substrate, as described in the present invention, at the surface of which a network of network molecules is adsorbed according to the present invention.

The present invention relates moreover to a module for treating a fluid formed of a sealed cabinet comprising means for circulating the fluid to be treated and containing one or several two-dimensional sieves, according to the present invention.

The present invention also relates to a treatment module formed moreover of a second sealed cabinet, both sealed cabinets being fitted with means for circulating a fluid separated by a wall traversed by one or several two-dimensional molecular sieves, said wall being formed of sufficiently fluid-proof material, but permeable to compounds diffusing through the sieve.

The present invention relates moreover to the usage of such a module as described in the present invention for treating a fluid.

BRIEF DESCRIPTION OF THE SEVERAL VIEWS OF THE DRAWINGS

The invention will be understood better when reading the following description, accompanied by the appended drawings.

FIGS. 1(a-c) are schematic views.

FIGS. 2(A-D) are electron micrograph illustrations and scans. FIG. 2(A) represents the structures of the following molecules: of the TSB35, coronene, hexabenzocoronene and pentacene. FIGS. 2(B), (C) and (D) refer respectively to an STM microscopy view of a 2-D sieve on its own (B) and after addition of coronene (C) or HBC (D).

FIGS. 3(A1), (A2), (A3) and (A4) are electron micrograph scans, representing the successive images under STM microscope of a 2-D sieve in the presence of coronene showing the diffusion of cavities in coronene cavities.

FIGS. 3(B) and 3(C) are electron micrograph scans.

DETAILED DESCRIPTION OF THE INVENTION

The present invention relates first of all to a method for treating a fluid. According to the invention, the fluid is contacted with a substrate at the surface of which there is a network of organic molecules, so-called molecules of network, or network molecules, having a central core as well as least one lateral arm, said network molecules being adsorbed at the surface of the substrate.

The network at the surface of the substrate may, in particular, be formed by network molecules capable of self-organizing when being deposited. The man of the art has a wide family of compounds available capable of adopting this behaviour [V. Barth, Nature, 2005, 437, 671-679]. Most these network molecules possess a central planar structure, corresponding to the central core, from which lateral arms radiate. As network molecules, it is also possible to use an assembly of compounds, certain of them ensuring the presence of the planar central structure and others forming the lateral arms, to form a network complex which behaves, at the surface of the substrate, like the molecules pursuant to the title of the invention [J. A. Theobald, letters to Nature, 2003, 424]. In the latter case the central core and said at least one lateral arm are not bound covalently but by weaker interactions and in particular of ionic type or hydrogen bonds. In the following statement the term network molecule, or molecule in the same signification, useable according to the invention must hence be understood to a greater extent and include, when relevant, such complexes. The "lateral arms" are then common to "central core" type compounds adjacent to one another within the network.

In both cases a network is obtained by self-assembly thanks to small interactions such as hydrogen bonds or Van der Waals interactions, between the different molecules. These network molecules may also involve ionic interactions and may then be in the form of salts, the counterions being typically of organic nature and preferably carried by another molecule of the network or by the same molecule.

The inventors consider that the discotic molecules are particularly interesting within the framework of the present invention.

Such molecules correspond to compounds having a planar aromatic core, the central core, may be substituted by various groups as well by alkyl type chains and carrying n lateral arms, n being an integer greater than or equal to 1, corresponding to $C_1$ to $C_{16}$-alkyl groups.

As aromatic core, aromatic or heteroaromatic carbonous structures may be quoted in particular, optionally mono- or polysubstituted, formed of one or several aromatic or heteroaromatic cycles each including 3 to 8 atoms, wherein the heteroatom(s) may be N, 0, P or S. The substituent(s) may contain one or several heteroatoms such as N, O, F, Cl, P, Si, Br or S as well as alkyl groups or groups carrying heteroatoms as an alcohol, amine, imine, ester, carboxylic acid, thiol, amide, ether, trifluoromethyl, ketone, aldehyde, sulfonyl, nitrile group. The general structure of the core may obviously be branched and include non-glued aromatic cores, and generally speaking, the entire n-type bond should form desirably a conjugated system.

The inventors consider that it is particularly advantageous that the aromatic core consists of benzene, pyridine, stilbene, such as 1,3,5-tristyrilbenzene, porphyrin, phthalocyanine, subphthalocyanine or their derivatives.

A lateral arm according to the invention consists in particular of a lateral chain which is an alkyl group corresponding generally to an alkyl chain whereof the length is greater than 4 carbon atoms and preferably ranging between 6 and 16. An alkyl group may also be branched, more or less saturated and more or less substituted. The substituent(s) may contain one or several heteroatoms such as N, O, F, Cl, P, Si, Br or S as well as groups carrying heteroatoms such as an alcohol, amine, imine, ester, carboxylic acid, thiol, amide, ether, trifluoromethyl, ketone, aldehyde, sulfonyl, nitrile group . . . The alkyl group should preferably be a little branched chain.

A lateral arm according to the invention may in particular be an alkyl, an alkoxy, an alkyl-ether preferably linear and situated at $C_6$ to $C_{16}$. In the case of a molecule carrying several lateral arms, the latter may have a different structure. It is interesting that one or several asymmetric centres, typically in the form of an asymmetric carbon, are present on at least one arm. It is recommended that the network molecule carries 6 arms.

The preferred network molecules possess a structure of general formula (I):

wherein R1 to R6 represent independently —$C_nH_{2n+1}$ alkyl groups, and in particular —$OC_nH_{2n+1}$ alkoxys, n being an integer greater than or equal to 1, and particularly in $C_6$ to $C_{16}$, and R7 to R9 are selected independently among hydrogen, $C_1$ to $C_4$ alkyl groups or a chemical function carrying one or several heteroatoms.

Advantageously the structure (I) possesses an axis of symmetry of order at least equal to 3.

It is preferable that $R_1$ and $R_6$, $R_2$ and $R_3$, $R_4$ and $R_5$ are respectively identical to one another or then $R_1$ to $R_6$ are identical to one another. R1 to $R_6$ should preferably be selected among alkyls, alkoxys, alkylethers exhibiting or not one or several insaturations and preferably linear in $C_6$ to $C_{16}$. The substituents $R_7$ to $R_9$ will be advantageously selected among the chemical functions carrying one or several heteroatoms, and in particular the alcohol, thiol and amine functions, or hydrogen, the substituents should preferably be identical and correspond ideally to hydrogens.

The molecules having a central core corresponding to a tristyrylbenzene carrying lateral arms, in particular —$OC_nH_{2n+1}$ alkoxy chains, with preferably n ranging between 6 and 16, in meta position of the peripheral aromatic cycles are particularly advantageous. The inventors consider that (1,3,5-tris[(E)-2-(3,5-didecyloxyphenyl)-ethenyl]benzene) or (1,3,5-tris[(E)-2-(3,5-didodecyloxyphenyl)-ethenyl]benzene), molecules for which the core is of tristyrilbenzene type and the lateral arms are identical and correspond to —$OC_{10}H_{21}$ or still —$OC_{12}H_{25}$ linear chains, and its derivatives are particularly suited to the invention.

The molecules are organized at the surface of the substrate thanks to the molecule-substrate interactions. The interdigitation of the lateral arms of the adjacent network molecules confers additional stability to the assembly. This stability can be increased by the presence of timely functional groups ("Cyano", <<OH>>, n-oxides . . . ) capable of creating additional bonds such as hydrogen or Van der Waals bonds.

The network molecules should preferably possess an axis of symmetry of order at least equal to 3. The order of symmetry of the axis of the molecules impacts the structure of the network, the man of the art, considering the network he wishes to obtain in view of the treatment contemplated for the fluid, will select the best suitable symmetry. An axis is called axis of symmetry of order m if the integer number m is such that the angle rotational $2\pi/m$ around this axis is the smallest angle leading la molecule to be self-superimposed.

Typically, a single spieces of network molecule is employed to form the network, but it is however possible to use different species.

The substrate according to the invention can be selected among organic or inorganic substrates. Said substrates should desirably have a surface having atomic scale planar terraces, preferably said terraces have a surface greater than or equal to 400 nm$^2$. It is however preferable to use an inorganic substrate, the latter may in particular be selected among metallic substrates like the transition metals such as Au, Ag, Cu or substrates used in biology or electronics such as silicon or carbon, for instance in the form of highly oriented pyrolytic graphite (HOPG). Due to the influence of the substrate on the organisation of the molecules, the molecule forming the self-organised network will need to possess sufficient chemical affinity in view of its adsorption on the substrate. The substrate may moreover undergo a surface treatment, such as oxidation, according to the properties that the user wishes the substrate to have.

The substrate will be advantageously selected in relation to the network molecules that the user wishes to employ and according to the affinity developing therebetween. It is known that generally speaking the adsorption barrier is not sufficiently significant to preserve small-sized molecules at the surface of a substrate as soon as one of the parameters of the medium, such as temperature or agitation, is modified. The presence of lateral arms on the useable network molecules according to the invention enables to bring great stability to the adsorbed molecules and confers significant flexibility in the selection thereof. Besides, the presence of lateral arms also enables to decrease the mobility of the molecules on the surface of the substrate whereon they are adsorbed, thus ensuring great stability to the network formed. This applies in particular to HOPG graphite surfaces because of the large affinity between the latter and aliphatic or alkoxy chains. For a gold substrate for instance, sulphur or nitrogen atoms may be integrated within such chains so as to increase the stability of the network on the surface. This method may be varied in relation to the known affinities of each substrate.

It should be noted that the network may be locally chiral without the molecules having necessary an asymmetric centre [Spillman et al., J. Ma. Chem. Soc, 2003, 125, 10725-10728]. Generally speaking, it is possible that zones of distinct chirality cohabit on the whole surface of the substrate. According to the user's wish, it may be possible to use a substrate capable of promoting the growth of a field of given chirality, such substrates possess chiral surfaces, generally they are dived monocrystals, neighbouring surfaces, i.e. stepped surfaces, are particularly suited.

The inventors consider that it is particularly interesting to employ a carbon surface, preferably in the form of highly oriented pyrolytic graphite, with molecules derived from stilbene and more particularly from tristyrylbenzene. It is also desirable that the molecule carries three, six or nine saturated lateral arms, preferably identical, such as $C_6$ to $C_{16}$ aliphatic chains. The order of the axis of symmetry of such molecules is typically of order 3.

The method according to the invention may moreover include a step of preparing the substrate. The man of the art is capable to making the necessary arrangements so that the surface of the substrate intended for receiving the network is clean, thus for instance in the case of HOPG it is preferable to use freshly dived surface.

Then, the substrate is covered by a network of network molecules, and the network molecules may be deposited in different ways. A first method consists in dissolving them in a suitable solvent, then in covering the surface with the solution obtained, wherein the solvent may then be evaporated. This type of deposition may be realised easily in conditions close to normal temperature and pressure conditions (NTPC, 1 atm, 25° C.). The experimental protocols should obviously be tailored in relation to the molecule, nevertheless the method may be implemented in a wide temperature range, limited by the boiling temperature of the solvent, as well as a wide pressure range. Thus, a drop of solvent including the solubilised network molecules may simply be deposited on the substrate whereon the molecules adsorb and form the network. Another method consists in depositing by sublimation, generally performed under ultra vacuum (UHV) from a Knudsen cell. When being deposited the molecules are adsorbed on the surface and self-organise in the form of a network, such a deposit exhibits the same characteristics as those obtained from a solvent. These methods lead to the realisation of a bidimensional or two-dimensional sieve type network (2-D sieve) formed of the network molecules assembled in the form of a network and adsorbed at the surface of the substrate.

The sieve is in the form of a substrate covered with a network of molecules which forms a true grid at its surface: molecular scale cavities, sole access to the surface of the substrate, are present within a vast carbon-containing skeleton formed of the set of molecules bound to one another by small interactions.

The size and the shape of the pores in the 2-D sieve can be, in particular, modulated by modifying the length of the lateral arms of the network molecules or the size of the central core. The affinities that the 2-D sieve develops with any compound may be modulated by the functionalisation of the lateral arms while introducing groups enabling the creation of hydrogen bond for instance.

The deposit of the molecules can be followed up using a microscope such as a scanning tunnelling microscope (STM).

In the sense of the invention, the treatment of the fluid corresponds in particular to purification or enrichment by extraction or addition of particular compounds, It may also correspond to reaction catalysis on compounds in solution in the fluid considered. The compounds will have to exhibit sufficient affinity with the selected substrate enabling them to be adsorbed therein. In the case of HOPG graphite, for instance, the system will adapt particularly well to PAH-type molecules (Polycyclic Aromatic Hydrocarbons) which can be found in particular in petroleums. The method may thus comprise a complementary step corresponding to the determination of the best suitable substrate for the compound of interest, STM observation of different surfaces in the presence of the compound will enable to select the one(s) for which affinity is the best suitable, regardless whether it is high or moderate.

The method applies particularly to non-viscous liquids in the selected operating conditions. The implementation parameters of the method being relatively flexible it is thus possible to vary one of them to adapt the method to most liquids. thus too viscous a liquid may be added an additional solvent to fluidize it, whereas the temperature or the pressure of the medium may also be changed. The concentration in species contained in the solvent may also be easily modulated inasmuch as one wishes to avoid a saturation of the sieve.

Thus according to a first embodiment the treatment method corresponds to a controlled enrichment method of a fluid with an enrichment compound. According to this embodiment the 2-D sieve is prepared so that the size of the pores is close to that of the enrichment compound and advantageously that weak bonds, such as hydrogen bonds, may develop between the enrichment compound and the network, and/or the substrate, when the enrichment compound is situated in a pore. Controlled variation of a parameter such as temperature enables to release the enrichment compound. Thus for instance for enriching a fluid with hexabenzocoronene (HBC) it is possible to use a 2-D sieve prepared from a network of tristyrilbenzene derivatives on HOPG. The enriched sieve can be prepared from HBC contacted with the 2-D sieve to temperature TV. The fluid to be treated may simply be contacted with the enriched 2-D sieve, and, as soon as it is desirable to release the HBC the 2-D sieve may be brought to a temperature T2 to which the network is looser. The control parameter may also be the global load of the sieve.

In a second embodiment the treatment corresponds to static purification of the fluid. This embodiment can be in particular implemented by adapting the size and the shape of the pores of the 2-D sieve to the size of the purification compounds that it is desirable to extract from the fluid. The purification compounds, in contact with the sieve are trapped in the pores. It is also possible to prepare the sieve so that weak bonds may develops between the network, and/or the substrate, and the purification compounds so as to increase the affinity existing between the 2-D sieve and these compounds so as to increase the purification efficiency. Besides, the use of a chiral sieve enables to extract selectively from the fluid one of the enantiomers of the purification compound if the latter is chiral. For instance the use of a 2-D sieve prepared from a network of tristyrilbenzene derivatives on HOPG enables to isolate HBC selectively within a solution formed of a mixture of polyaromatic hydrocarbons (PAH):coronene, HBC and pentacene.

In a third embodiment, the treatment corresponds to dynamic purification. This type of purification makes use of the specific properties of the 2-D sieves according to the invention. If the 2-D sieve corresponds to a true trap for certain compounds as divulged in the previous embodiments, it also behaves like a transfer surface for other molecules which then diffuses from pores to pores. The sieve may thus be used in particular for separating compounds of variable sizes. This type of dynamic behaviour occurs in particular for liquid-solid interfaces, whereof the (molecules in solution/available pores) ratio is typically of the order of the hundred. By way of example, the density of pores derived from self-organisation on a HOPG graphite surface of the TSB35 molecule provided with C-10 lateral arms amount to $8 \times 10^{12}$ pores/cm$^2$.

According to a particular embodiment it is desirable to establish a temperature gradient on the 2-D sieve. The pore-to-pore transfer speed of certain surface molecules then depends on the temperature of the sieve at the position occupied by the molecules of the compound considered within it. The higher the temperature, the greater the speed. This enables to direct the movement of the molecules of the compound from the warmer zones of the sieve towards the colder zones. Selective sorting between the molecules of the compound considered which for instance remain trapped in the pores (HBC for instance) and the molecules which diffuses from pores to pores (coronene for instance) may be realised. A judicious choice of the molecules forming the 2-D sieve enables to confer or not dynamic properties to given molecules. A wall, situated parallel to the surface of the substrate, enables moreover to minimise the diffusion of the molecules to be filtered via the liquid.

According to a fourth embodiment the treatment corresponds to a catalysis performed on fluid-dissolved compounds. It is an application of the difference in mobility between molecules of different sizes within the network. According to this embodiment a proportion, of 1 per 1000 to 1 for 100000 and preferably 1 for 10000, of network molecule is modified so that it carries a catalyst. The fluid containing the molecules to be treated is contacted with the catalytic surface thus realised in a heterogeneous catalytic reactor. Thus for instance, by using a sieve consisting of TSB 35 in the case of an oxidation of polyaromatic compounds such as coronene and HBC, most HBC molecules present in the fluid are trapped at the surface thanks to the self-assembled network and never meet the chemical catalyst moiety. The coronene molecules present, for their own parts, are surface mobile and thus guided towards the molecules containing the chemical catalyst moiety and thereby oxidized.

The invention also relates to a two-dimensional molecular sieve formed of a substrate at the surface of which a network of network molecules is adsorbed, in particular those presented above, characterised in that the adsorbed molecules are capable of self-organising at the surface to form a network.

The invention also relates to the use of such a sieve for treating a fluid.

More particularly the molecular sieve object of the invention is a 2-D sieve such as presented above.

The present invention relates moreover to a module for treating a fluid formed of a cabinet, which may be sealed, including means for circulating the fluid to be treated and containing one or several 2-D sieves as well as its usage for the treatment of said fluid. The module includes advantageously means for establishing a temperature gradient inside the cabinet and advantageously at the surface of each of the sieves.

The module may also be formed of two cabinets, preferably sealed, fitted with means for circulating a fluid separated by a wall traversed by one or several two-dimensional molecular sieves, said wall being formed generally of sufficiently fluid-proof material, but permeable to the compounds diffusing through said molecular sieve.

The treatment module may also correspond to a device wherein one or several 2-D sieves, and in particular on a substrate such as a graphite sheet or one or several multilamella nanotubes, are used bridgingly between a first medium containing the fluid to be treated, typically in the form of a tub, and a second medium, typically in the form of a tub containing another fluid or then under vacuum. The fluid to be treated including here again compounds to be isolated, extraction takes place in the direction of the first towards the second medium, or then to be injected, the displacement of the compound molecules taking place in the direction of the second towards the first medium. The use of heating means, in the form of a temperature gradient imparted to the bridging 2-D sieve may be advantageously set up for easier displacement of material as specified previously.

The fixing time of a molecule of a particular compound may easily be modulated with temperature: it decreases when temperature increases.

The invention implements two-dimensional nanostructured elements organized by self-assembly and enables work at nanometric scale. The invention may thus be used in numerous fields of application as electronics or biology. It may be implemented easily and rapidly, indeed, the use of self-organizing network molecules enables to avoid heavy molecular engineering steps. The consequence is a lesser cost for the use on small as well as larger surfaces.

Besides the method may be used according to different, static or dynamic modes, which confers great flexibility to the user. It may be implemented on small quantities of fluid due to direct interaction of the surface with the fluid, and thereby enables not to waste any matter. Direct interaction also confers great speed to the treatment.

Finally the control possibilities conferred by the invention at nanometric level are important, the use in dynamic mode enables to control the movement of the individual molecules more directly.

The present invention relates moreover to the usage of such a module as described in the present invention for treating a fluid.

As illustrated, on a 1-cm$^2$ HOPG substrate, whereof the surface has been dived before usage so as to guarantee the cleanliness thereof, the presence of atomically planar terraces has been implemented, here over several hundred nm$^2$, from 300 to 600, has been noticed by STM observation.

The employed network molecule is derived from tristyrylbenzene, i.e. (1,3,5-tris[(E)-2-(3,5-didodecyloxyphenyl)-ethenyl]benzene). (TSB35), it has also been provided with (1,3,5-tris[(E)3,5-didodecyloxyphenyl)-ethenyl]benzene) ($OC_{12}H_{25}$ lateral arm). The latter has been solubilised in a solvent (phenyl-octane or tetradecane) at approximately $10^{-4}$ mol/L concentration. A drop of the solution has been then deposited on the freshly dived sample. The 2-D sieve thus obtained has been characterized using an STM microscope, operating directly in the liquid, whereof the tip is immersed in the drop.

Figure 1:
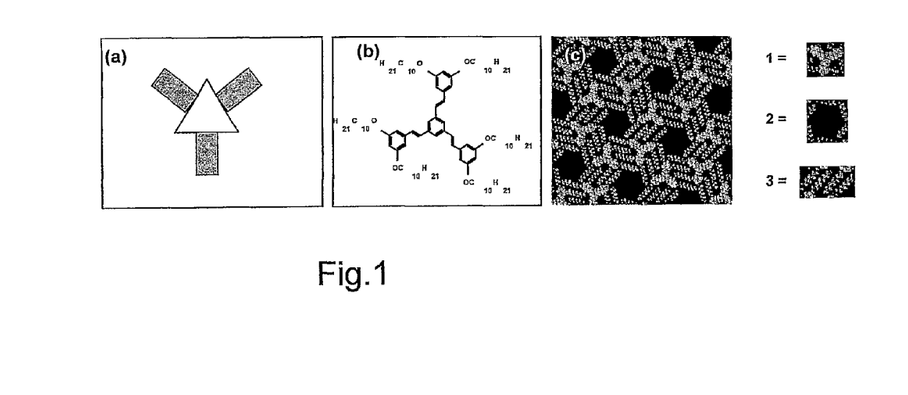
FIG. 1(a) represents diagrammatically a network molecule.
FIG. 1(b) represents the structure of the network molecule represented on FIG. 1(a).
FIG. 1(c) represents diagrammatically a network of molecules according to the invention on a surface.

The TSB35 network (FIG. 1b) has a honeycomb type hexagonal geometry, including cavities of approximately 1.3 nm in diameter connected by channels of approximately 1.1 nm in width. The sieve structure consisting of network molecules (FIG. 1b) is represented on FIG. 1c whereon appear the zones blocking the passage of molecules (1), the pores enabling to accommodate molecules (2) and the channels letting through molecules from pores to pores (3).

Figure 2:
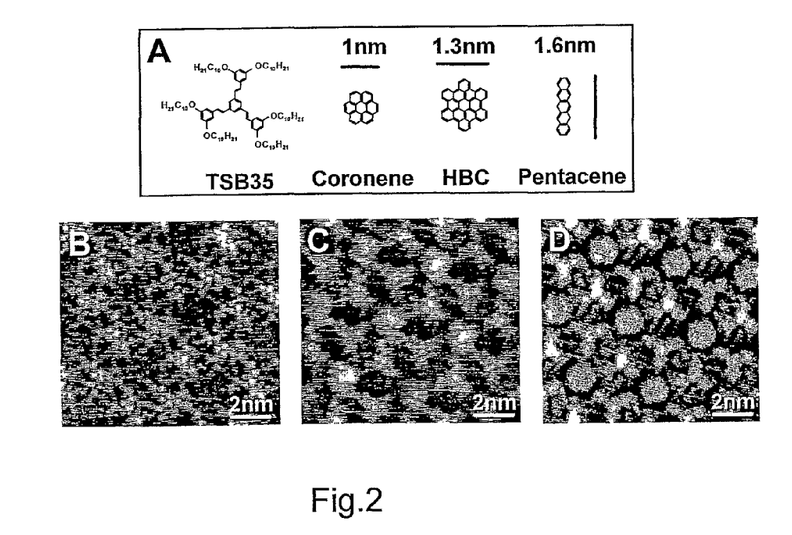

Successive addition of solvent (phenyl-octane or tetradecane for instance) containing different polyaromatic hydrocarbon type compounds (PAH) enables to put in evidence the selective adsorption properties of the 2-D sieve. Specifically, three compounds of different size and shape, whereof the structure is presented on FIG. 2, have been tested, i.e. coronene, hexabenzocoronene (HBC) and pentacene.

STM analysis has been conducted on the samples at constant height with 40 ms scan speed per line, −1000 mV sample polarisation and 46 pA reference current, the temperature of the medium has been set to approximately 12° C. The observation of shiny discs inside each cavity confirms the selective trapping of the individual coronene and HBC molecules. Pentacene, of size greater than the diameter of the cavity, is not adsorbed.

A reduction in concentration of the compounds in the solvent leads to restricted filling ratio of the cavities enabling selective transport of the compounds from one cavity to another, which has then been put in evidence. At high scanning speed (0.5 images per second) the jump of molecules from one cavity to another is observable directly, at slower rate (0.05 images per second) scores uniformly distributed and parallel to the scanning direction can be observed: they indicate molecular jumps from one cavity to another during the acquisition of the image. Successive STM microscopy images over a 11×11 nm$^2$ surface, at 24 ms/line scanning speed, 11 pA tunnel current, $V_{peak}$=1000 mV) extracted from a sequence of 50 STM images obtained at 12° C. are presented on FIG. 3A. The displacement of the molecules from one pore to another in the network is indicated by arrows.

Figure 3:
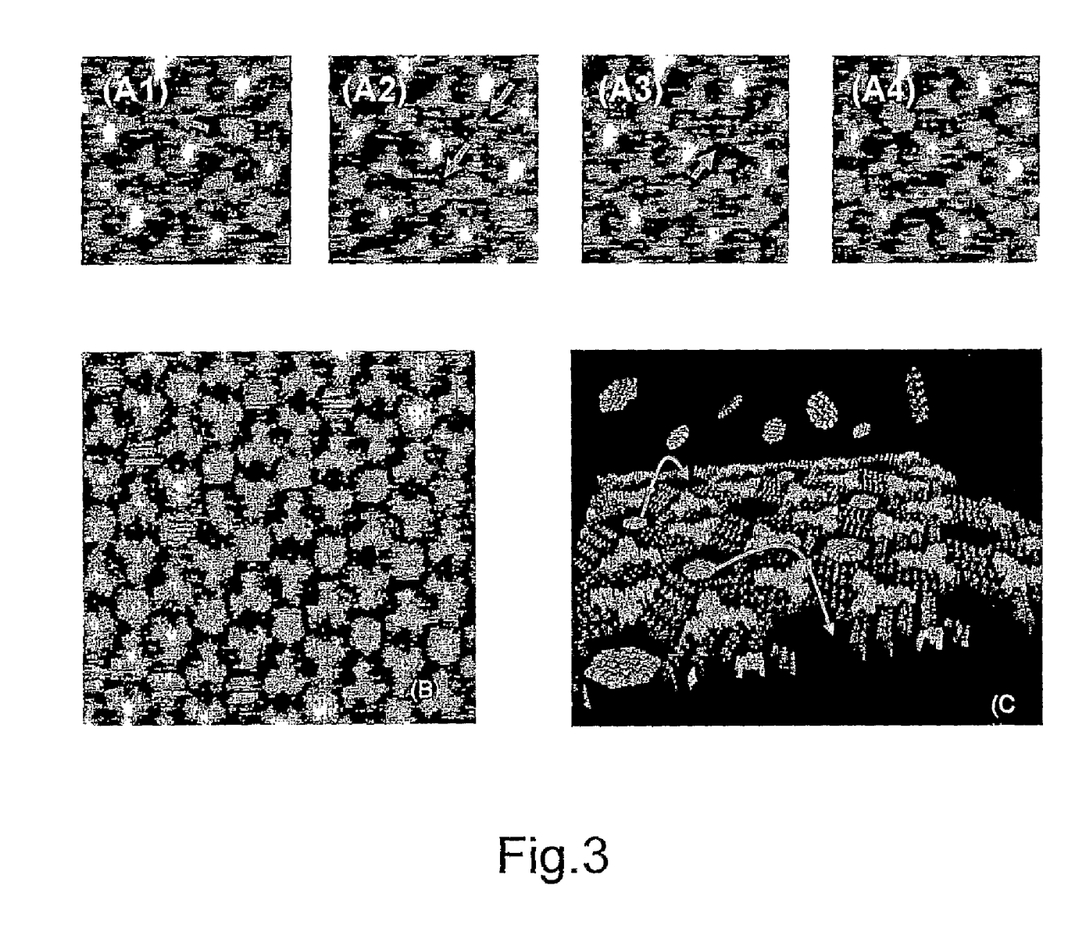
FIG. 3(B) represents the STM image of a 2-D sieve in the presence of a combined sub-stoeichiometric solution of coronene and HBC.
FIG. 3(C) illustrates the selective transport of molecules in the presence of a 2-D sieve.

The coronene molecules move from one cavity to another by diffusion in the surface plane, the HBC molecules (of size greater than that of the channels) remain trapped inside each cavity. FIG. 3B corresponds to an image obtained by STM of a mixed sub-stoeichiometric solution [concentration of cavities per unit surface area 8.2×10$^{12}$ cavities/cm$^2$] of coronene and HBC (horizontal scan, 20×20 nm$^2$, scan speed: 160 ms/line, reference current 8 pA) on a 2-D sieve. The cavities accommodating transitorily a coronene molecule appear as being scored contrary to those containing HBC molecules.

Figure 6:
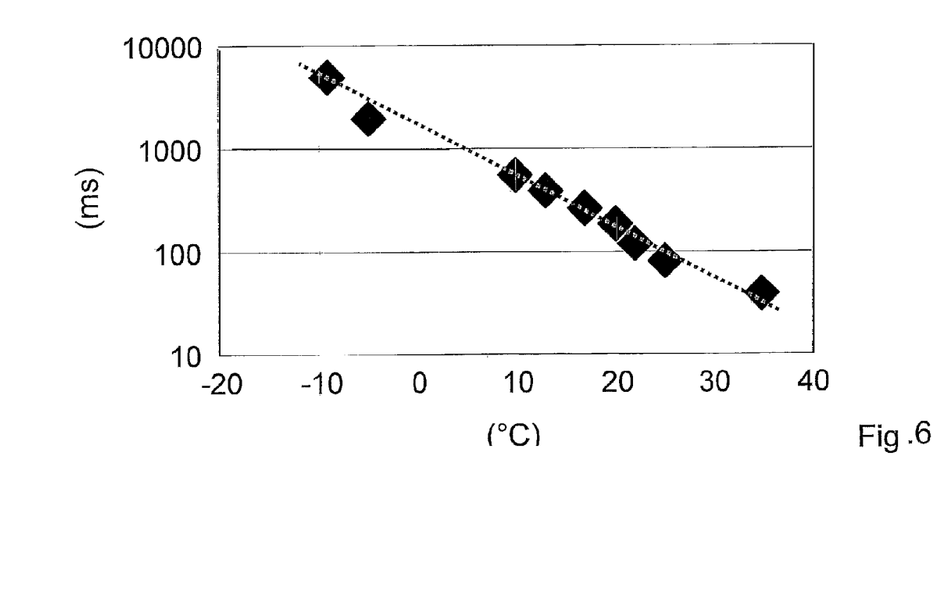
FIG. 6 is graph illustration of a logarithmic curve representing the evolution of the residence time (ms) of a molecule within a 2-D sieve in relation to temperature (° C.).

The residence time within each cavity is modular via modification of the temperature of the substrate. The higher the temperature of the sieve, the shorter the residence time of the molecules within the pores. On the graph presented on FIG. 6, corresponding to the residence time of coronene molecules in a TSB35 network, it may be observed that the dynamics of the coronene molecules within a network is accelerated by a factor 100 when the temperature of the sample increases by 44° C.

Besides, most modules of the invention generally take advantage from the presence of a temperature gradient at the surface of the 2-D sieve(s), which they contain. Such a gradient enables to promote the displacement of the molecules. Thus for instance, and as illustrated on FIG. 4, the molecules solubilised in a liquid flow from the left (In) and adsorb on the sieve. The gradient then enables to direct the molecules from the warmer to the colder sections (from left to right on the drawing), so as to be extracted at output (out).

The mode of displacement in the presence of the 2-D sieve of coronene, HBC and pentacene is illustrated on FIG. 3C: the coronene molecules move through the channels formed by the lateral arms of the network molecules whereas the HBC molecules remain fixed in the pores, the pentacene molecules are too big to be able to penetrate into the pores, they thus remain outside the network established on the surface.

Figure 5:
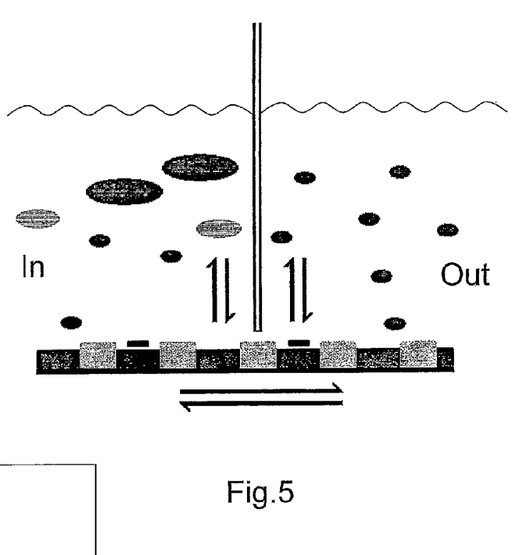
FIG. 5 is a schematic view of a type of module for the use of the method in dynamic mode for separating compounds of variable sizes.

The central core of the network molecules is an obstacle to the displacement of the molecules, whose size is small enough (HBC and coronene) to penetrate into a pore, but too big (HBC only) to move through the network. The molecules capable of moving at the surface are those whereof the size is sufficiently small (HBC and coronene) to penetrate into a pore then to move in the network through spaces, true channels, formed by the lateral arms (example: coronene),

A first module is represented on FIG. 5, it is a module wherein two sealed cabinets, or two tubs, one containing a fluid to be treated (In) and the other a second fluid (Out), which are separated by an insulating membrane for blocking the passage of liquid. A 2-D sieve according to the invention is arranged at the interface(s) of the membrane and the wall(s) of the cabinets. The 2D sieve may also be used as a wall at the membrane. Only the small molecules may here diffuse through the channels present on the sieve which represents the only passage means between both cabinets. Thus the smallest molecules may be extracted from the first medium (in) towards the second (out). Passing from one medium to the other is the more efficient as the distance whereon it takes place is close to the average size of a monodomain of network molecule. Thus, In the case of a TSB35 network on HOPG and of a PAH solution from which it is desirable to extract coronene molecules, the average size of the monodomain ranges from 100 nm to 1000 nm in width.

Figure 4:
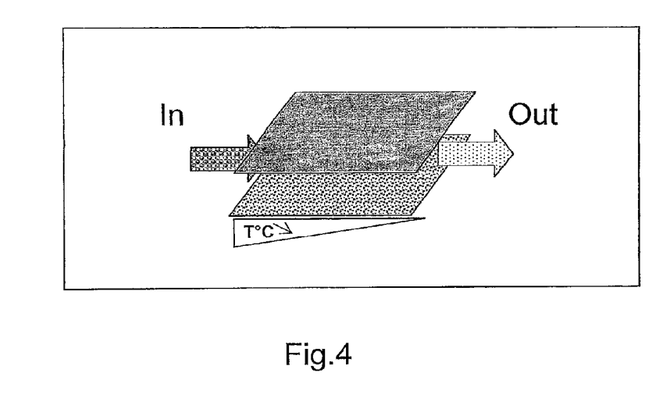
FIG. 4 is a schematic view of a particular embodiment of the invention involving a temperature gradient.
Figure 7:
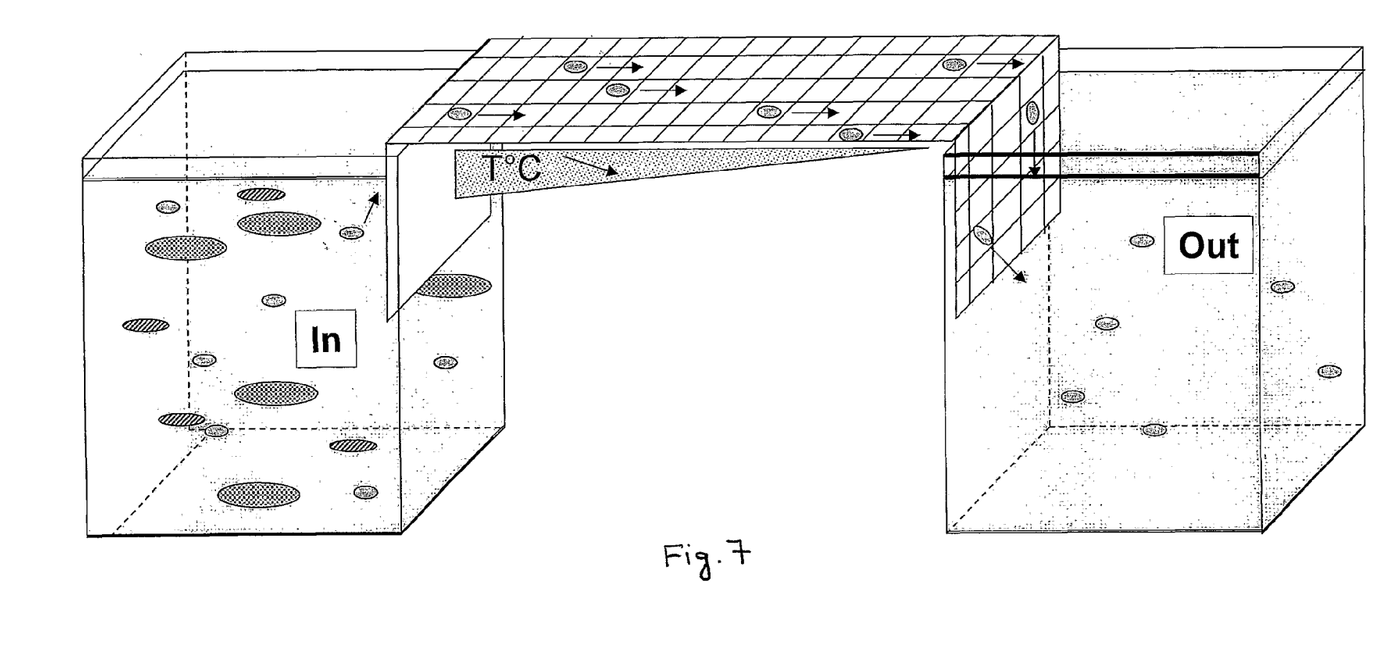
FIG. 7 is a schematic view, illustrating another type of module for the use of the method in dynamic mode for separating compounds of variable sizes.

Another type of treatment module represented on FIG. 7 corresponds to a module wherein the 2-D sieve is used bridgingly between a first medium containing the fluid to be treated, typically in the form of a tub, and a second medium, typically in the form of a tub containing another fluid or then under vacuum. For instance the central portion is an HOPG surface covered with the TSB35 network. The left side of the surface is immersed in the solution of molecules to be filtered (In). Solely the molecules whose size is suitable for the diffusion process adsorb within the cavities. The use of such a device enables to extract the coronene molecules from a PAH solution. Besides it is also possible to use a temperature gradient which orients the dynamics of the molecules from left to right (FIGS. 4 and 7). The molecules migrate in dry condition up to the right-hand portion of the tube, where they land in the out vessel liquid (Out). Such device may advantageously be used in most media, the sieve need not necessarily be covered with liquid.

Figure 8:
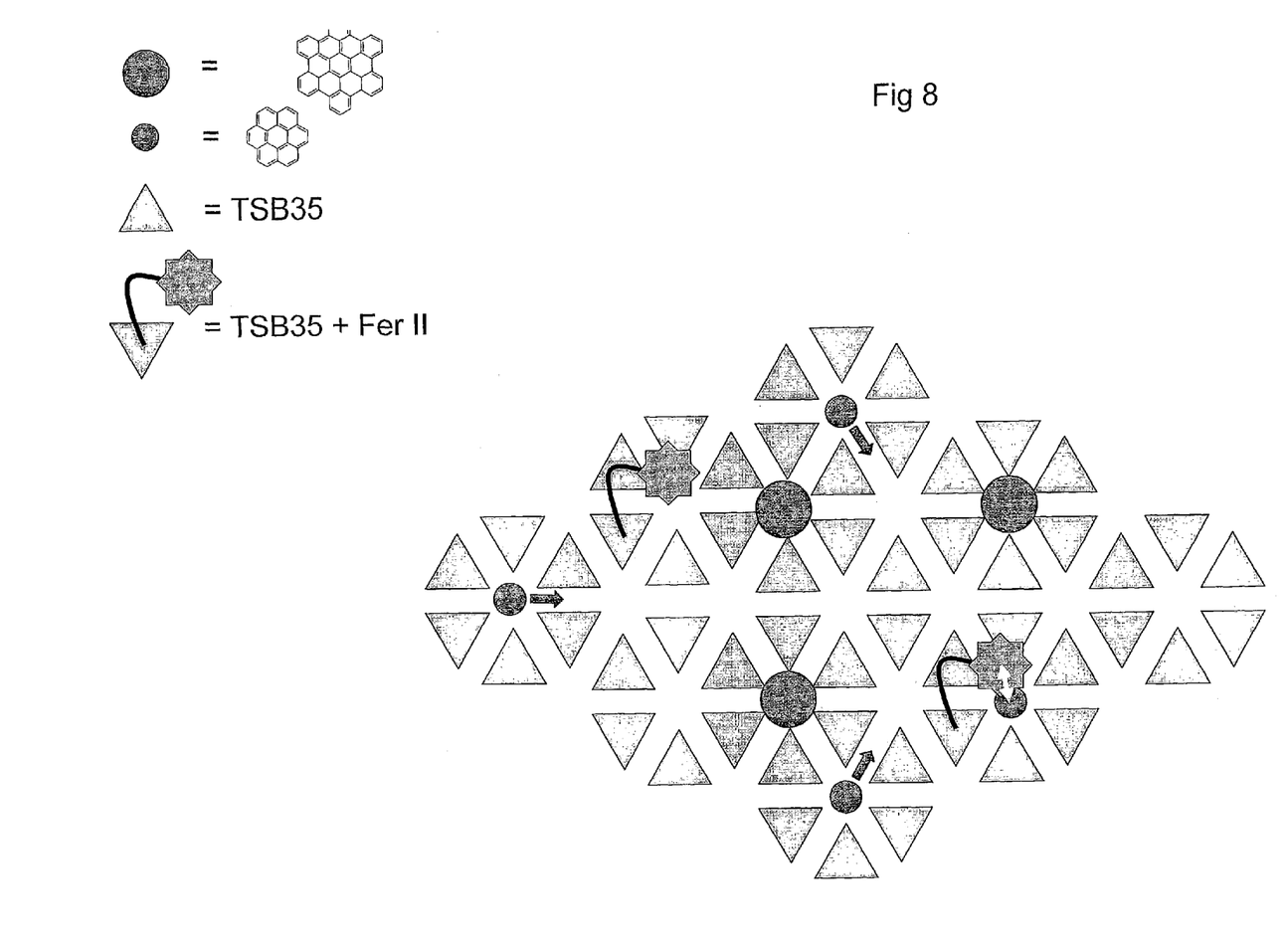
FIG. 8 is a schematic view, representing a particular embodiment of the invention wherein the treatment corresponds to catalysis.

The treatment that a fluid may undergo could be a selective reaction for instance: of coronene in a PAH solution containing other constituents of chemical reactivity comparable to those of coronene but of different molecular size, such as hexabenzocoronene (HBC), and any other PAH formed of more than six aromatic cycles, may be oxidised selectively. The surface of the catalyst is formed of HOPG graphite whereon network molecules are adsorbed, for instance TSB35. Some of these molecules (typically one per 10000) are substituted chemical with a chemical catalyst moiety of the oxidation reaction, typically a iron compound with (II) oxidation degree (a complex such as (II) iron phthalocyanine or (II) iron ring ether for instance). Alternately, this complex may be itself adsorbed at the surface, providing it is big enough for immobilisation therein. The fluid containing the molecules to be treated is contacted with the catalytic surface thus realised in a heterogeneous catalytic reactor. Most HBC molecules are trapped at the surface thanks to the self-assembled network and never meet the chemical catalyst moiety. The coronene molecules, for their own parts, are surface mobile and thus guided towards the molecules containing the chemical catalyst moiety and thereby oxidised (FIG. 8).

We claim:

1. A method for treating a fluid, said method comprising the steps of:
    contacting fluid with a substrate, said substrate having a network of organic molecules adsorbed on a surface thereof, the network molecules being self-organizing and of formula (I):

(I)

wherein R1 to R6 represent independently —$C_nH_{2n+1}$ alkyl groups or —$OC_nH_{2n+1}$ alkoxy groups, n being an integer greater than or equal to 1, and R7 to R9 are selected independently from the group consisting of hydrogen, $C_1$ to $C_4$ alkyl groups and a chemical function carrying one or several heteroatoms.

2. The method according to claim 1, wherein the network molecules are discotic molecules.

3. The method according to claim 1, wherein the network molecules of formula (I) possess an axis of symmetry of order at least equal to 3.

4. The method according to claim 1, wherein R1 and R6, R2 and R3, and R4 and R5 are respectively identical to one another or then R1 to R6 are identical to one another.

5. The method according to claim 1, wherein R7 to R9 represent a chemical function carrying one or several heteroatoms.

6. The method according to claim 1, wherein R7 to R9 represent a hydrogen atom.

7. The method according to claim 1, wherein the network molecules are selected from the group consisting of (1,3,5-tris[(E)-2-(3,5-didecyloxy-phenyl)-ethenyl]benzene) and (1,3,5-tris[(E)-2-(3,5-didodecyloxyphenyl)-ethenyl]benzene).

8. The method according to claim 1, wherein said substrate is comprised of a metal, silicon or carbon.

9. The method according to claim 8, wherein said substrate is comprised of oriented pyrolytic graphite.

10. The method according to claim 8, wherein said substrate has a surface having atomic scale planar terraces.

11. The method according to claim 10, wherein the terraces have a surface greater than or equal to 400 nm².

12. The method according to claim 10, wherein said surface of the substrate is a neighbouring surface.

13. The method according to claim 1, wherein the fluid is a non viscous liquid.

14. The method according to claim 1, further comprising: establishing a temperature gradient on a two-dimensional sieve, formed of the network molecules assembled in the form of a network and adsorbed at the surface of the substrate.

15. The method according to claim 1, wherein treating a fluid corresponds to a treatment selected from the group consisting of: a static purification of the fluid, a controlled enrichment of the fluid with an enrichment compound and a catalysis performed on fluid-dissolved compounds.

16. The method according to claim 1, wherein treating a fluid corresponds to a dynamic purification of the fluid.

17. The method according to claim 16, wherein treating a fluid corresponds to a catalysis performed on fluid dissolved compounds and wherein a proportion of network molecules ranging between 1 per 1000 and 1 per 100000 is modified so that it carries a catalyst.

18. The method according to claim 8, wherein,
the step of contacting fluid with a substrate comprises contacting one or several two-dimensional molecular sieves comprising the substrate having the network of organic molecules adsorbed on a surface thereof.

19. The method according to claim 18, wherein,
the one or several two-dimensional molecular sieves are contained within a sealed cabinet, and
the fluid is circulated within the cabinet so that the fluid contacts the substrate.

20. The method according to claim 18, wherein,
the one or several two-dimensional molecular sieves form part of a treating device comprising a first sealed cabinet and a second sealed cabinet,
the fluid is circulated within both of the sealed cabinets,
the sealed cabinets are separated by a wall traversed by the one or several of two-dimensional molecular sieves so that the circulated fluid contacts the substrate, and
said wall is formed of sufficiently fluid-proof material, but permeable to compounds diffusing through the one or several two-dimensional molecular sieves.

21. The method according to claim 8, wherein a two-dimensional molecular sieve comprises the substrate having the network of organic molecules adsorbed on a surface thereof, said sieve forms a module for treating the fluid in a sealed cabinet in which the fluid to be treated is circulated so that the fluid contacts the substrate, said sealed cabinet containing one or several two-dimensional molecular sieves.

22. The method according to claim 1, wherein n is an integer selected from 6 to 16.

* * * * *

UNITED STATES PATENT AND TRADEMARK OFFICE
CERTIFICATE OF CORRECTION

PATENT NO.        : 8,377,306 B2                                        Page 1 of 1
APPLICATION NO. : 12/295288
DATED             : February 19, 2013
INVENTOR(S)       : Attias et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1178 days.

Signed and Sealed this

First Day of September, 2015

Michelle K. Lee
*Director of the United States Patent and Trademark Office*